US008918420B2

(12) United States Patent
Cocking

(10) Patent No.: US 8,918,420 B2
(45) Date of Patent: Dec. 23, 2014

(54) APPARATUS, AND ASSOCIATED METHOD, FOR OBTAINING MOBILITY DEVICE INFORMATION

(75) Inventor: Lee Cocking, Waterloo (CA)

(73) Assignee: BlackBerry Limited, Waterloo (CA)

( * ) Notice: Subject to any disclaimer, the term of this patent is extended or adjusted under 35 U.S.C. 154(b) by 442 days.

(21) Appl. No.: 12/829,480

(22) Filed: Jul. 2, 2010

(65) Prior Publication Data

US 2011/0264693 A1 Oct. 27, 2011

Related U.S. Application Data

(60) Provisional application No. 61/327,697, filed on Apr. 25, 2010.

(51) Int. Cl.
*G06F 17/30* (2006.01)

(52) U.S. Cl.
CPC .................. *G06F 17/30864* (2013.01)
USPC ............ 707/770; 707/792; 709/217; 719/328

(58) Field of Classification Search
None
See application file for complete search history.

(56) References Cited

U.S. PATENT DOCUMENTS

| 2004/0111393 | A1* | 6/2004 | Moore et al. ........................ 707/3 |
| 2005/0075115 | A1* | 4/2005 | Corneille et al. .......... 455/456.3 |
| 2006/0075120 | A1 | 4/2006 | Smit |
| 2009/0100099 | A1 | 4/2009 | Buckwalter |
| 2010/0161804 | A1 | 6/2010 | Jeon et al. |

* cited by examiner

*Primary Examiner* — Anh Tai Tran
(74) *Attorney, Agent, or Firm* — Blake, Cassels & Graydon LLP; Wilfred P. So; Brett J. Slaney

(57) ABSTRACT

An apparatus and associated method is provided for facilitating a search for user information in a multiple-domain communication scheme. A search is initiated by way of a web-based console. A search request causes search inquiries to be made to each of the domains of the multi-domain communication scheme. And, search results are provided also by way of a web-based console.

14 Claims, 6 Drawing Sheets

_282_

Return to search results

User Details for: lcocking2

| | |
|---|---|
| User Id | 4 |
| User Config Id | 2 |
| Email Address | lcocking2@eap.testnet.rim.net |
| Server | NA_BES |
| State | INITIALIZING |
| Open BlackBerry Administration Service | ⦿ |
| Mail Server | /o=First Organization/ou=Exchange Administrative Group (FYDIBOHF23SPDLT)/cn=Con |
| Mailbox Name | /o=First Organization/ou=Exchange Administrative Group (FYDIBOHF23SPDLT)/cn=Rec |
| Mail User Name | lcocking2 |
| Wireless Calendar Enabled | True |
| Wireless Message Reconciliation Enabled | False |
| PIN | |
| Device Model | |
| Application Version | |
| Platform Version | |
| Carrier | |
| Phone Number | |
| Serial Number | |
| SIM Id | |
| Policy Assigned | |

| | |
|---|---|
| Policy Assigned | |
| Policy On Device | |
| Policy Effective Time | |
| Policy Sent Time | |
| Policy Received Time | |
| Policy Status | |
| Resolved Group Names | |
| Redirect To BlackBerry Device | True |
| Rich Content Enabled | True |
| Save Copy In Sent Folder | True |
| Inline Images Enabled | True |
| Auto Signature | |
| Last XP Action | NO_VALUE |
| Last Contact | |
| Last Message Received By Device | |
| Last Message Sent From Device | |
| Total Messages Expired | 0 |
| Total Messages Failed | 0 |
| Total Messages Filtered | 0 |
| Total Messages Forwarded | 0 |
| Total Messages Pending | 0 |
| Total Messages Sent From Device | 0 |

FIG. 6

APPARATUS, AND ASSOCIATED METHOD, FOR OBTAINING MOBILITY DEVICE INFORMATION

CROSS REFERENCE TO RELATED APPLICATION

This application claims priority to U.S. Provisional Patent Application No. 61/327,697, filed Apr. 25, 2010, the content of which is incorporated herein by reference.

The present disclosure relates generally to a manner by which to search and to retrieve user mobility information located at any of multiple disparate domains. More particularly, the present disclosure relates to an apparatus, and an associated method, by which to search for, and to obtain the information, using a web-based, search console.

The search initiation and response review, by way of a web-based search console, eliminates the conventional need for an administrator separately to access each of multiple administrative consoles associated with corresponding multiple domains.

BACKGROUND

Advancements in communication technologies have permitted the development and deployment of many new types of communication systems having communication capabilities providing increased communication convenience and improved communication services. Improved communication mobility is amongst the communication improvements provided in various of such new communication systems. And, for many, access to mobile communication systems through which to communicate both voice and data has become essential for business, and other, activities. Data messaging, such as that provided by way of e-mail messaging, and the like, provides message senders and recipients with near-instant communication capabilities as well as, also, store-and-forward messaging capabilities. A sender is able to send a message at the sender's convenience, and the recipient of the message is able to receive and review the message, at the recipient's convenience, whether immediately or at some subsequent time.

Business, and other, enterprises sometimes provide enterprise personnel with mobile communication devices, herein referred to at times as mobile stations, to provide enterprise personnel with messaging, and other communication capabilities. In a large enterprise organization, large numbers of enterprise personnel are sometimes provided with the mobile stations.

An enterprise administrator is sometimes encharged with maintaining operability of the mobile stations, implementing communication policies, and generally otherwise overseeing and controlling communication operations at the enterprise.

Particularly when the enterprise is large, the enterprise might utilize multiple domains in which different enterprise personnel are associated with different ones of the domains, sometimes at physically disparate locations. And, sometimes, some enterprise personnel might be associated with more than one domain. The term "domain" is used herein to refer to a collection of resources, including and relating to a group of mobile stations, which have in common an administrative/management system or a configuration database therefor.

A communication scheme that includes multiple domains provides additional challenges to an administrator. For instance, when searching for information regarding the mobile station used by enterprise personnel, the administrator has to access and to search at the appropriate domain of the multiple domains in order to obtain the needed information. In conventional operation, to do so, the administrator is required to log into the appropriate administration service console and then locate the needed information. This existing need, however, becomes unwieldy and cumbersome, particularly when the administrator might not know in which domain to search for the information, and a large number of domains are employed by the enterprise. In these situations, the administrator might be required to resort sequentially to log into successive domains and search for the information, prior to logging-into the appropriate administration service console associated with the appropriate domain.

It is in light of this background information related to mobile communication systems that the significant improvements of the present disclosure have evolved.

BRIEF DESCRIPTION OF THE DRAWINGS

FIG. 5 illustrates another console display, also generated pursuant to an embodiment of the present disclosure.

FIG. 6 illustrates another console display, also generated pursuant to operation of an embodiment of the present disclosure.

DETAILED DESCRIPTION

Figure 1:
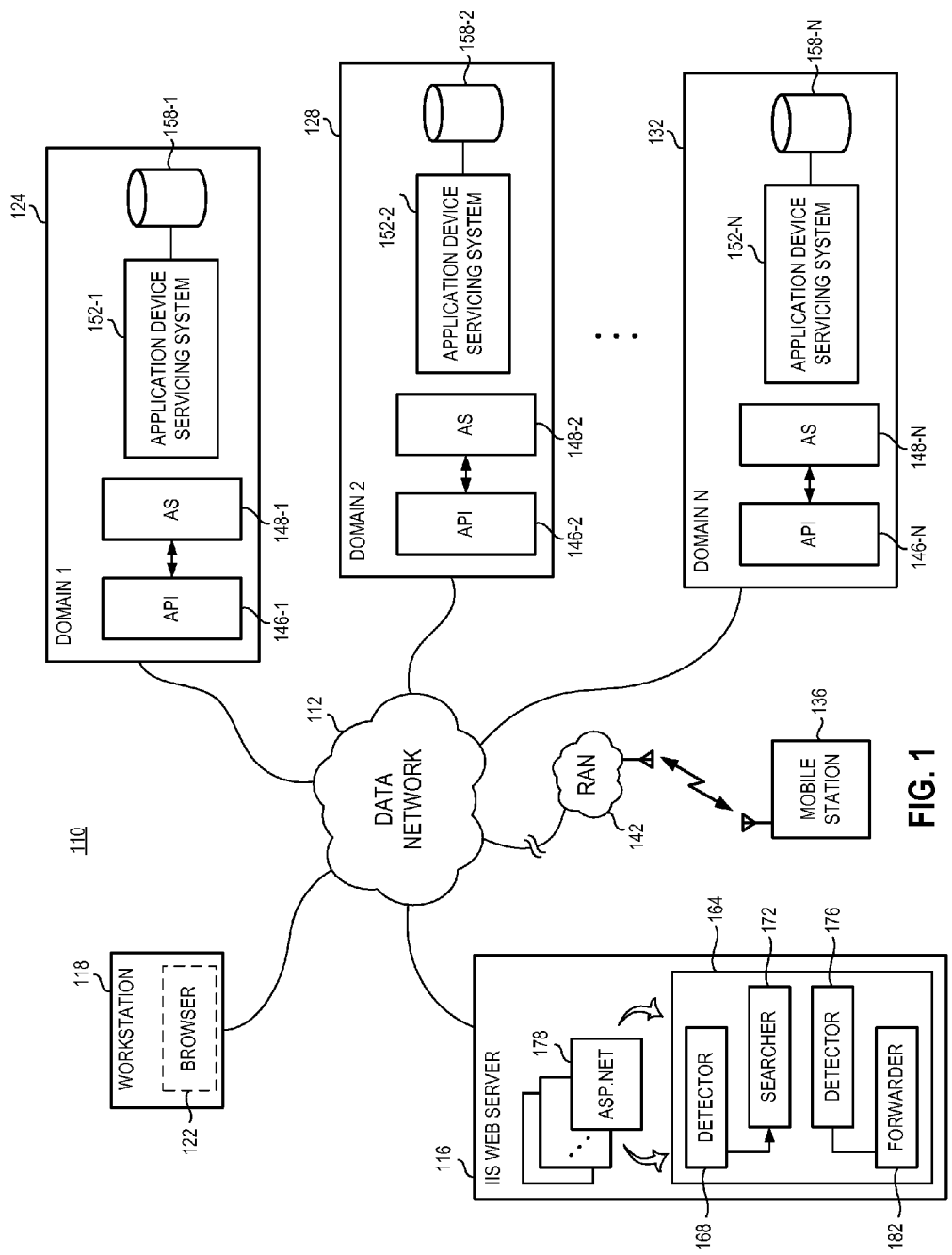
FIG. 1 illustrates a functional block diagram of a communication system in which an embodiment of the present disclosure is operable.

The present disclosure, accordingly, advantageously provides an apparatus, and an associated method, by which to search and to retrieve user mobility information located at any of multiple, disparate domains.

Through operation of an embodiment of the present disclosure, a manner is provided by which to search for, and to obtain, the information using a web-based search console.

In one aspect of the present disclosure, the search initiation and response review, performed by way of the web-based search console, permits the information to be obtained without requiring that a system administrator separately access administrative consoles associated with domains at which the information might be located.

In another aspect of the present disclosure, a simple and centralized mechanism is provided that provides searchability into all of the domains of a multiple-domain implementation.

In another aspect of the present disclosure, a web-based search console is provided. The search console provides for searching by a system administrator, or other authorized party, to search for user information in every domain utilized by the enterprise. Searching is performed without requiring the administrator, or other party, to log on to individual administration service consoles associated with each of the separate domains in order to obtain the user information.

In another aspect of the present disclosure, once the location of the information has been found, e.g., by locating the domain location at which the identity of the associated enterprise personnel is located, the information is retrieved without requiring the administrator or other party to log into an administration service console associated with the domain in which the information is located.

In another aspect of the present disclosure, the administrator or other authorized party is further permitted to complete administrative actions related to the user information by way of the console. The console provides a link whose selection redirects the administrator to the specific administration service of the domain where the user information is located.

In another aspect of the present disclosure, various technologies are leveraged, including IIS, ASP, and administration API (Application Processing Interface). ASP.NET web pages run on an enterprise-deployed IIS web server. ASP.NET web pages make API calls to an administration API of each of the domains that are configured for the enterprise. The configuration is completed by way of a WEB.CONFIG file in the same folder as the ASP.NET web page files on the IIS server. In another aspect of the present disclosure, the ASP.NET web pages make API calls to the administration API in each of the enterprise-configured domain. The configuration is completed by way of a WEB.CONFIG file, located, e.g., in the same folder as the ASP.NET web page files on the IIS server. Although specific commercial products, such as the IIS web server and the ASP.NET application framework are mentioned herein, the subject matter of the present disclosure is not limited to such products, and other web servers and application frameworks could also be used with appropriate adjustments to employ analogous features of such servers and frameworks.

In another aspect of the present disclosure, authentication is provided. The authentication is, e.g., active directory authentication, or administration service authentication. Additionally, in one implementation, a static set of credentials is configured so that credentials need not be requested when browsing to the address of the ASP.NET web pages.

The administrator, or other authorized party, is thereby able to obtain user information located at any of a plurality of disparate domains by way of a console at a remote workstation. The information is obtained without requiring the administrator or other party to log on to an administration service console of each of the domains in which the information might be located. More efficient control and simplified administration is thereby provided.

In these and other aspects, therefore, an apparatus, and an associated method, is provided for facilitating a search at disparate domains for user information. A search request detector is configured to detect a search request for user information. A searcher is adapted to receive indications of the search request detected by the search request detector. The searcher searches each of the disparate domains for the user information.

Turning first, therefore, to FIG. 1, a communication system, shown generally at 110, comprises a data-network 112, such as an enterprise intranet to which functional communication entities are connected in communication connectivity. The entities of the communication system are functionally represented and are positionable at any physical location, including distributed across a plurality of physical locations. The entities are also implemented in any desired manner, including hardware, software, and combinations thereof.

The example communication system shown in FIG. 1 includes an IIS (Internet Information Services) web server 116 and an example work station 118. The work station 118 is representative of a work station that an enterprise administrator, or other party, utilizes to monitor and control an enterprise communication system. The work station 118 is operable in generally-conventional manner to invoke applications, here including a browser application 122. The administrator or other party invokes the browser application pursuant to operation of an embodiment of the present disclosure, here to access the IIS web server 116 and to receive console displays therefrom.

The communication system also includes a plurality of disparate domains, such as a first domain 124, a second 128, and an Nth domain 132. The domains 124, 128, 132 are representative of different domains, any of which are associated with mobile stations operated by enterprise personnel, viz., users of the mobile stations. The communication system 110 illustrates an example mobile station 136, here shown to be connected to a Radio Access Network (RAN) that is, here, indirectly connected to the data network 112. The mobile station is associated with any of the domains 124, 128, and 132, and potentially more than one of the domains.

The first domain includes an application programming interface (API) 146-1, an administration service (AS) 148-1, an application device servicing system 152-1, and a user and configuration database 158-1. Generally, the aforementioned elements of the first domain are operatively connected to one another, directly or indirectly, for communications therebetween. The second domain includes analogous entities, that is, an API 146-2, an AS 148-2, an application device servicing system 152-2, and a user and configuration database 158-2. And, analogously, the Nth domain 132 includes an API 146-N, an AS 148-N, an application device servicing system 152-N, and a user and configuration database 158-N.

Information associated with the mobile station 136 is stored at a user and configuration database 158-1, 158-2 and 158-N, depending upon with which of the domains that the mobile station is associated. As noted previously, in conventional operation, if an administrator or other party needs to obtain user information, that is, information that is associated with the mobile station, the administrator is required to log into each of the administration services of each of the domains, at least until the desired information is obtained. To obviate this conventional requirement, the web server 116, or other entity, includes the apparatus 164 of an embodiment of the present invention. The elements of the apparatus 164 are functionally represented, implementable in any desired manner, including hardware, software, and combinations thereof. Functional elements of the apparatus are here shown to include a search request detector 168, a searcher 172, and search result detector 176, and a search result forwarder 182. In the example implementation, the apparatus is implemented as an API (Application Programming Interface) and ASP.NET web pages, of which the pages 178 are representative. In operation, the administrator or other party at the work station is provided with a web-based search console that provides for searching of needed user information located at any of the domains 1-N. The user-related information is of a type permitting searching of the needed information. The information comprises, for example, a user name, an email address, an IT policy, a messaging server, etc. The input of this information at the work station is provided to the web server and detected by the search request detector 168. In response, the detector causes the searcher 172 to search the domains for the information. In the example implementation, API calls are made to appropriate web services API components of the APIs 146 of the domains 1-N. The user and configuration data bases are caused to be accessed, and the needed information, if stored thereat, is returned to the web server. Responses to the searches are detected by the search result detector 176, which, in turn, provides the received search result response or responses to the forwarder 182. In turn, the forwarder forwards on the received information for display at the work station.

In the example implementation, the administrator or other party, upon receipt of information that at least identifies the location at which user information is stored, i.e., at which of the domains that the user information is located, the administrator is permitted to take further action to retrieve additional information without logging into the specific administration service console in the domain. Thereby, information search and retrieval is carried out more conveniently and quickly than conventionally permitted. The request for additional information comprises, for instance, an administrative services request, and the search request detector 168 further functions as an administrative services request detector, and the searcher 172 further functions as a forwarder for forwarding the request for additional information to the appropriate domain.

Figure 2:
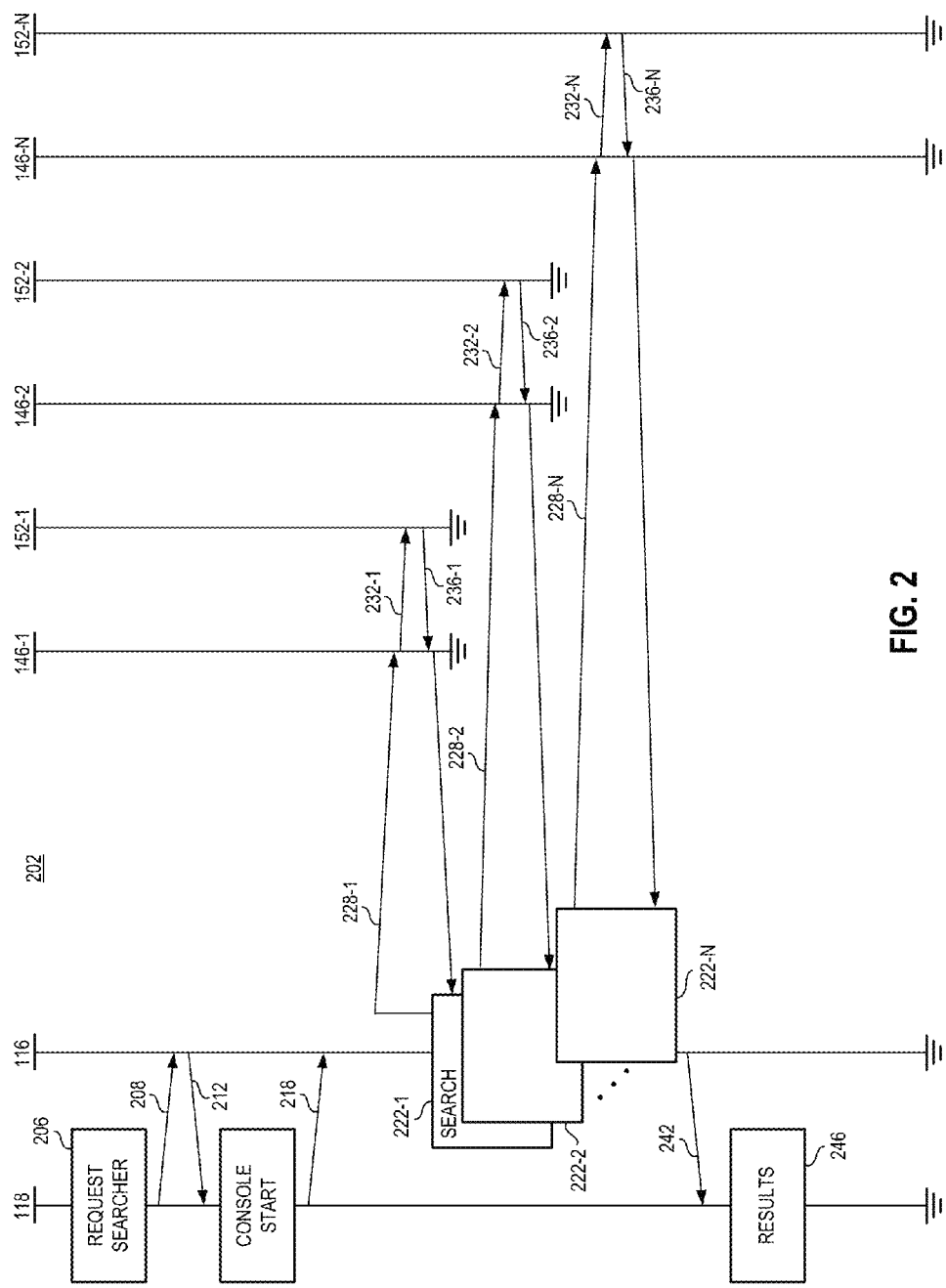
FIG. 2 illustrates a message sequence diagram representative of example operation of an embodiment of the present disclosure.

Turning next to FIG. 2, a process, shown generally at 202, is representative of signaling generated during operation of an embodiment of the present disclosure. The signaling is representative of the signaling generated during the operation of the example system 110, shown in FIG. 1. Signaling generated in other communications can analogously be represented.

The process commences at the work station 118 when an administrator or other party initiates operation, here by requesting commencement of search procedures, indicated by the request search block 206. A message is caused to be sent, indicated by the segment 208, to the web server 116. The web server responds, indicated by the segment 212 to provide a search console to the work station to be displayed thereat pursuant to browser operation of the work station. The search request indicated by the block 206 is also generated pursuant to operation of a browser application at the work station. The console start block 214 is representative of the display at the browser application of the search console.

Figure 3:
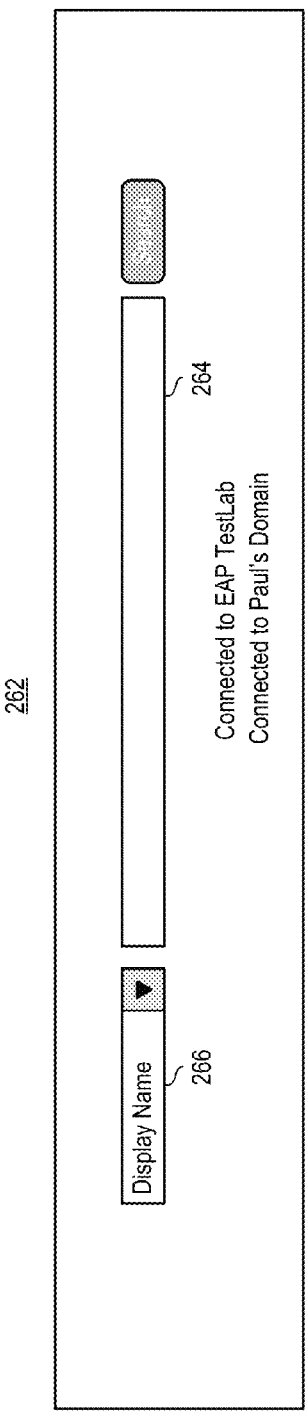
FIG. 3 illustrates a console display generated pursuant to operation of an embodiment of the present disclosure.

The administrator or other party, by way of the console at the work station, generates a search request, indicated by the segment 218, that is delivered to the web server 116. In response to the search request, the web server initiates searches, indicated by the blocks 222 to the different domains. In the example implementation, three domains are represented, and three search blocks, search blocks 222-1, 222-2, and 222-N are shown in FIG. 2. ASP. NET web pages make API calls to the APIs 146 of the domains, as indicated by the segments 228-1, 228-2, and 228-N. The APIs, in turn, access the respective application device servicing system 152 and associated databases 158, indicated by the segments 232-1, 232-2, and 232-N. Responses are generated, and returned, indicated by the segments 236-1, 236-2, and 236-3 to the respective APIs 146. And, the APIs, in turn, return the search results to the web server 116. The web server then forwards on, indicated by the segment 242, the search results, to the work station 118. The results are displayed, indicated by the block 246. FIG. 3 illustrates an example start console 262, representative of a console displayable at a work station at which an administrator, or other authorized party, is positioned to operate an embodiment of the present disclosure. The console 262 is representative of a start console at which the administrator or other party enters information relating to a search request, here at a search field 264. The entered information comprises search criteria, such as a user name, display name, user identification, an email address, an IT policy, a messaging server identity, etc. In an embodiment, the administrator user may optionally identify the type of search criteria using an appropriate selection widget 266, which my be a drop-down or any other appropriate selection widget.

Figure 4:
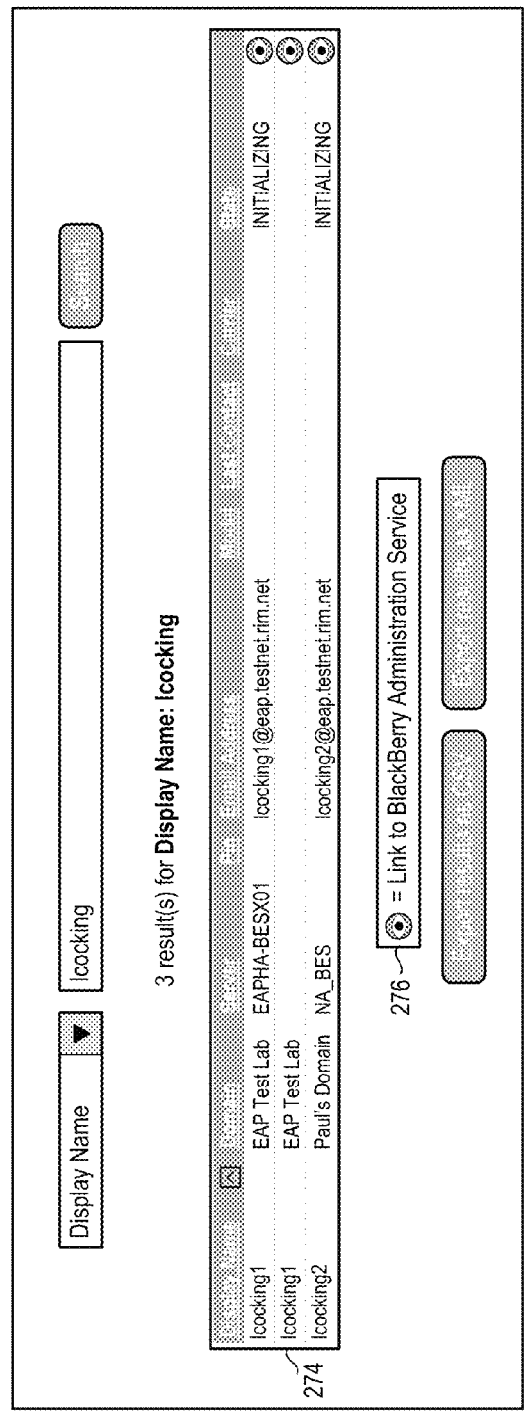
FIG. 4 illustrates another console display, also generated pursuant to of an embodiment of the present disclosure.

FIG. 4 illustrates a console display 272, representative of another console displayable at a work station during operation of an embodiment of the present disclosure. The console display illustrates example search results 274 generated pursuant to operation of an embodiment of the present disclosure. Here, the search results include information related to a search inquiry entered in the field 264. The console display 272 further includes a link 276 that, if selected, provides a direct link to an appropriate Administration Service (AS) console of an appropriate domain in the event that the administrator or other party needs to perform additional, advance administrative actions.

FIG. 5 illustrates another screen console display, console display 282, representative of another example console generated pursuant to operation of an embodiment of the present disclosure. The console display illustrates example information retrieved and display at a work station. FIG. 5 illustrates a console display 286, which forms a continuation of the console display 282, shown in FIG. 5, of information returned to the work station pursuant to operation of an embodiment of the present disclosure. Review of the console displays 282 and 286, indicate that user information, mail information, device information, IT policy information, group information, device settings, and device message information is all potentially available for review by the administrator or other party. In other implementations, other, or additional, information is provided.

Figure 7:
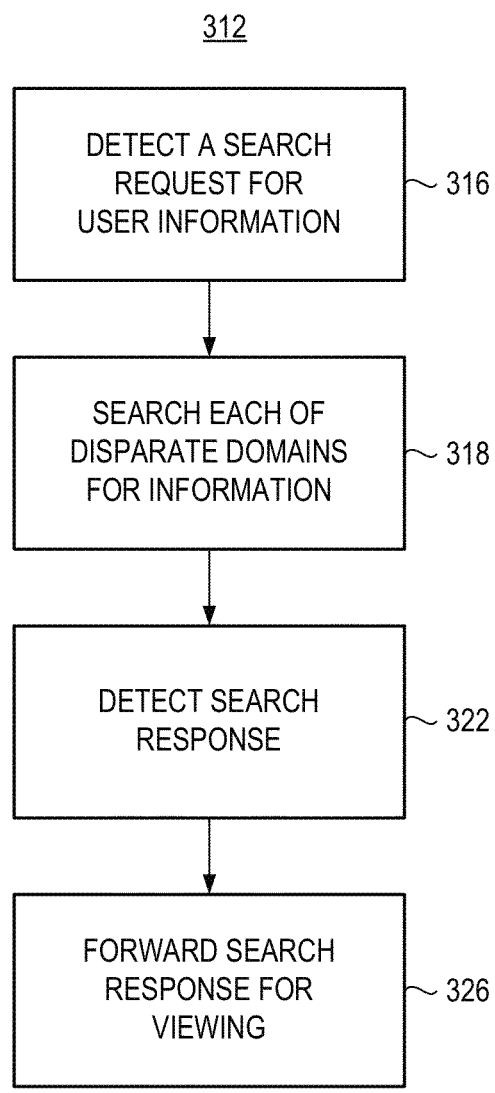
FIG. 7 illustrate a method flow diagram, representative of the method of operation of an embodiment of the present disclosure.

FIG. 7 illustrates a method flow diagram, shown generally at 312, representative of the method of operation of an embodiment of the present disclosure. The method facilitates a search at disparate domains for user information. First, and as indicated by the block 316, detection is made of a search request for user information. User information may include, for non-limiting example, information related to a user's communication service or the management or configuration of such service, in conjunction with one or more domains, or the administration services thereof. Then, and as indicated by the block 318, each of the disparate domains is searched for user information responsive to the search request. Then, and as indicated by the block 322, a search response is detected. And, as indicated by the block 326, the search response is forwarded for viewing by, e.g., an administrator or other authorized party.

Presently preferred embodiments of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. A computer for facilitating administrative actions for a mobile device, the computer comprising an Application Processing Interface (API), the computer configured to communicate with disparate domains and a work station device over a data network, each given domain comprising a domain API, an administration service and a user and configuration domain database storing information about one or more mobile devices associated with the given domain, and the computer further configured to execute instructions comprising:

providing a search page comprising names of the disparate domains with which the computer is in communication and a search field to receive a search request, wherein the search page is configured to be displayed by the work station device and the names of the disparate domains are displayed prior to receiving the search request;

receiving, from the work station device, the search request for user mobility information associated with a specific mobile device;

using the API to make calls to each of the domain APIs in the disparate domains, each of the calls configured to cause each of the domain APIs to access the respective user and configuration databases to search for the user mobility information;

receiving search results from the domain APIs, the search results identifying at least one domain storing the user mobility information and the identified domain is associated with the specific mobile device;

providing a direct link between the work station device and the administrative service of the identified domain; and facilitating the work station device retrieving additional information from the identified domain without logging into the administrative service of the identified domain.

2. The computer of claim 1 further comprising a search results web page comprising the search results and a control, wherein when the control is selected, the computer provides the direct link between the work station device and the administrative service of the identified domain, and wherein the search results web page is configured to be displayed by the work station device using a web browser.

3. The computer of claim 1 wherein the computer provides the direct link after receiving a selection input via a console displayed by the work station device.

4. The computer of claim 1 wherein the search request comprises a user identification.

5. The computer of claim 4 wherein the user identification comprises a user name.

6. The computer of claim 4 wherein the user identification comprises a user-associated messaging server.

7. The computer of claim 1 wherein the user mobility information comprises at least one of: user information, mail information, device information, IT policy information, group information, device settings and device message information.

8. A method performed by a computer for facilitating administrative actions for a mobile device, wherein the computer comprises an Application Processing Interface (API), the computer is configured to communicate with disparate domains and a work station device over a data network, each given domain comprising a domain API, an administration service and a user and configuration database storing information about one or more mobile devices associated with the given domain the method comprising:

providing a search page comprising names of the disparate domains with which the computer is in communication and a search field to receive a search request, wherein the search page is configured to be displayed by the work station device and the names of the disparate domains are displayed prior to receiving the search request;

receiving, from the work station device, the search request for user mobility information associated with a specific mobile device;

using the API to make calls to each of the domain APIs in the disparate domains, each of the calls configured to cause each of the domain APIs to access the respective user and configuration databases to search for the user mobility information;

receiving search results from the domain APIs, the search results identifying at least one domain storing the user mobility information and the identified domain is associated with the specific mobile device;

providing a direct link between the work station device and the administrative service of the identified domain; and facilitating the work station device retrieving additional information from the identified domain without logging into the administrative service of the identified domain.

9. The method of claim 8 further comprising generating a search results web page comprising the search results and a control, wherein when the control is selected, the computer provides the direct link between the work station device and the administrative service of the identified domain, and wherein the search results web page is configured to be displayed by the work station device using a web browser.

10. The method of claim 8 wherein the search request detected during said detecting comprises a user identification.

11. The method of claim 10 wherein the user identification comprises a user name.

12. The method of claim 10 wherein the user identification comprises a user-associated messaging server.

13. The method of claim 8 wherein said searching further comprises making API calls to each of the disparate domains for the user information.

14. The method of claim 8 wherein the computer provides the direct link after receiving a selection input via a console displayed by the work station device.

* * * * *